US011392487B2

(12) United States Patent
Levacher et al.

(10) Patent No.: US 11,392,487 B2
(45) Date of Patent: Jul. 19, 2022

(54) SYNTHETIC DEIDENTIFIED TEST DATA

(71) Applicant: International Business Machines Corporation, Armonk, NY (US)

(72) Inventors: Killian Levacher, Dublin (IE); Stefano Braghin, Dublin (IE); Naoise Holohan, Maynooth (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/098,549

(22) Filed: Nov. 16, 2020

(65) Prior Publication Data

US 2022/0156177 A1    May 19, 2022

(51) Int. Cl.
  *G06F 9/44* (2018.01)
  *G06F 11/36* (2006.01)
  *G06F 11/34* (2006.01)

(52) U.S. Cl.
  CPC ...... *G06F 11/3692* (2013.01); *G06F 11/3452* (2013.01); *G06F 11/3684* (2013.01); *G06F 11/3688* (2013.01)

(58) Field of Classification Search
  CPC ............. G06F 11/3692; G06F 11/3452; G06F 11/3684; G06F 11/3688
  See application file for complete search history.

(56) References Cited

U.S. PATENT DOCUMENTS

| 8,862,557 B2 | 10/2014 | Glasser |
| 8,935,575 B2 | 1/2015 | Patwardhan |
| 2002/0169793 A1* | 11/2002 | Sweeney ............ G06Q 20/383 715/255 |
| 2019/0042290 A1* | 2/2019 | Bailey ................ G06F 8/31 |
| 2019/0362222 A1* | 11/2019 | Chen ................ G06V 10/82 |
| 2020/0012902 A1* | 1/2020 | Walters ............. G06F 9/547 |

(Continued)

OTHER PUBLICATIONS

"Refine test management; accelerate application delivery", IBM InfoSphere Optim Test Data Management, downloaded from the Internet on Nov. 4, 2020, 7 pps., <https://www.ibm.com/us-en/marketplace/infosphere-optim-test-data-management>.

(Continued)

*Primary Examiner* — Chat C Do
*Assistant Examiner* — Lenin Paulino
(74) *Attorney, Agent, or Firm* — David K. Mattheis; Maeve Carpenter

(57) ABSTRACT

Embodiments include a method for one or more processors to receive an organic dataset and a domain knowledge base. The one or more processors identify private data entities present within the organic dataset. The one or more processors determine statistical properties of the private data entities identified within the organic dataset. The one or more processors create a plurality of test data templates by removing the private data entities from the organic dataset. The one or more processors select from the domain knowledge base, synthetic data entities that match a data type of the removed private data entities, respectively, and align with the statistical properties of the private data entities, and the one or more processors generate synthetic test data by inserting, respectively, the synthetic data entities of the matching data type for the removed private data entities in the test data templates.

14 Claims, 4 Drawing Sheets

(56) References Cited

U.S. PATENT DOCUMENTS

2020/0012934 A1* 1/2020 Goodsitt ........... G06F 16/24568

OTHER PUBLICATIONS

Alzantot et al., "SenseGen: A deep learning architecture for synthetic sensor data generation," 2017 IEEE International Conference on Pervasive Computing and Communications Workshops (PerCom Workshops), Kona, HI, 2017, 2 pp., <https://ieeexplore.ieee.org/abstract/document/7917555>.

Arasu et al., "DataSynth: Generating Synthetic Data using Declarative Constraints", 4 pgs., Proceedings of the VLDB Endowment, vol. 4, No. 12, Copyright 2011 VLDB Endowment, <http://www.vldb.org/pvldb/vol4/p1418-arasu.pdf>.

Braghin et al., "An Extensible De-Identification Framework for Privacy Protection of Unstructured Health Information: Creating Sustainable Privacy Infrastructures", Data Privacy Group, IBM Research, and Health and Person-Centred AI Group, IBM Research, Mar. 2019, 5 pps.

Guan et al., "Generation of Synthetic Electronic Medical Record Text," 2018 IEEE International Conference on Bioinformatics and Biomedicine (BIBM), Madrid, Spain, 2018, pp. 374-380, <https://ieeexplore.ieee.org/abstract/document/8621223/>.

Paxton et al., "Use of Synthetic Data in Testing Administrative Records Systems," Proceedings, Federal Committee on Statistical Methodology (FCSM), Washington, DC, 2012, 9 pages.

Pudjijono, "Accurate Synthetic Generation of Realistic Personal Information", Advances in Knowledge Discovery and Data Mining, 13th Pacific-Asia Conference, PAKDD 2009, Bangkok, Thailand, Apr. 27-30, 2009, 13 pps.

Sagduyu et al., "Synthetic Social Media Data Generation," in IEEE Transactions on Computational Social Systems, vol. 5, No. 3, pp. 605-620, Sep. 2018, <https://ieeexplore.ieee.org/abstract/document/8438309/>.

Smith et al., "Improving the Synthetic Data Generation Process in Spatial Microsimulation Models", Environment and Planning A: Economy and Space, 2009;41(5):1251-1268.

\* cited by examiner

SYNTHETIC DEIDENTIFIED TEST DATA

FIELD OF THE INVENTION

The present invention relates generally to the field of application development, and more particularly to generating sets of de-identified test data from organic data for testing applications under development.

BACKGROUND OF THE INVENTION

The effectiveness and performance of applications are dependent upon testing performed prior to production readiness. Application development often includes testing of application components as they are coded and may include several layers of testing as the components are integrated into a final test version of the application. The effectiveness of application testing often depends on identifying the application use cases that span all the intended uses and conditions the application is expected to perform.

Choosing a representative dataset to use for testing the developed application can successfully identify expected as well as unexpected operation of the application. Test data that closely mirrors the expected usage of the application is desired. The data elements can be referred to as data entities and may include particular data types, such as numerical counts, financial figures, transactions, as well as unstructured data that typically includes words and phrases, and can be mixed with numerical data as well.

SUMMARY

Embodiments of the present invention disclose a method, computer program product, and system for generating a set of synthetic test data. The method provides for one or more processors to receiving an organic dataset and a domain knowledge base. One or more processors identify private data entities present within the organic dataset. One or more processors determine the statistical properties of the private data entities identified within the organic dataset. One or more processors create a plurality of test data templates by removing the private data entities from the organic dataset. The one or more processors select from the domain knowledge base, synthetic data entities that match a data type of the removed private data entities, respectively, and align with the statistical properties of the private data entities, and the one or more processors generate synthetic test data by inserting, respectively, the synthetic data entities of the matching data type for the removed private data entities in the test data templates.

DETAILED DESCRIPTION

Figure 1:
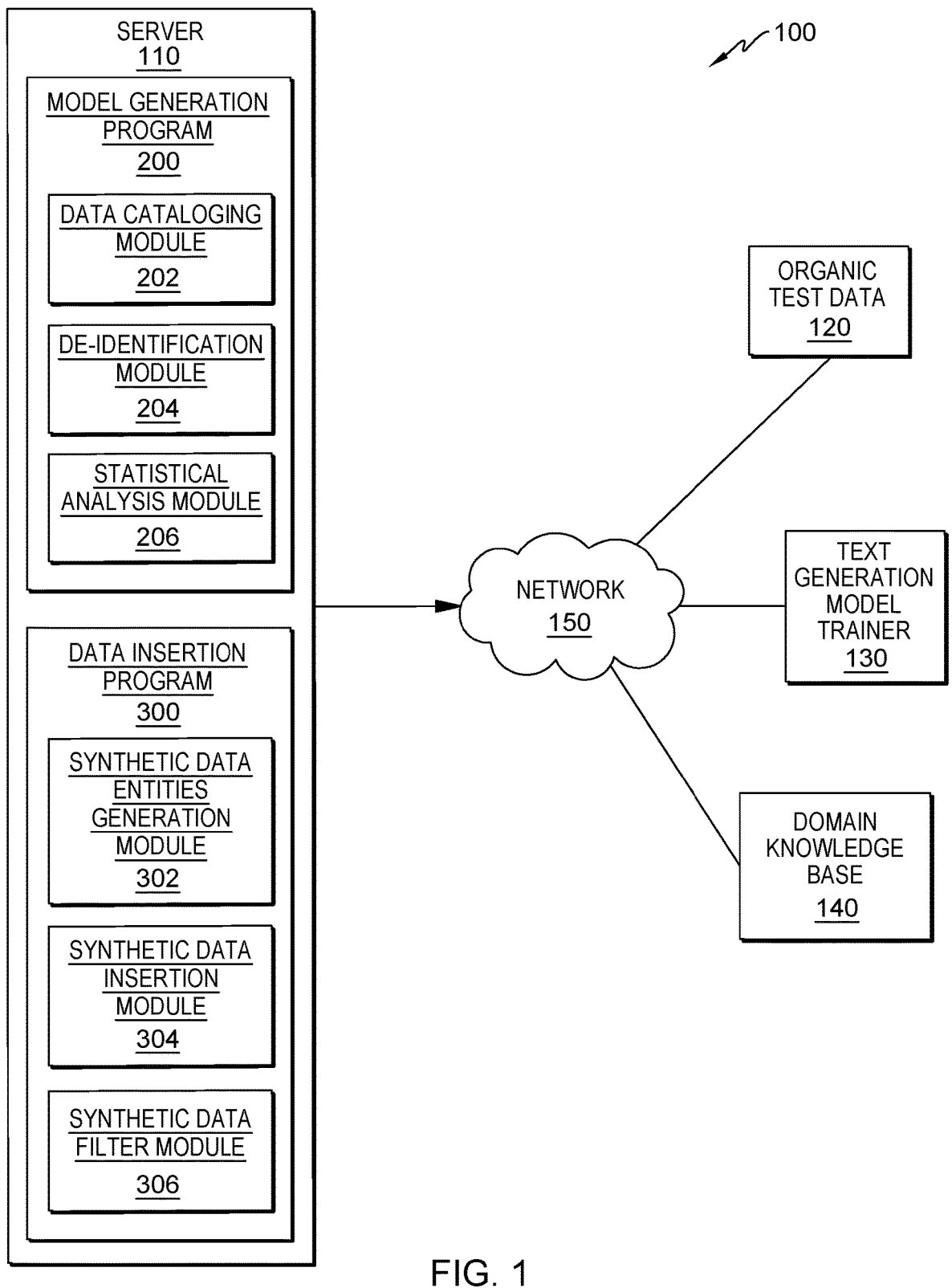
FIG. 1 is a functional block diagram illustrating a distributed data processing environment, in accordance with an embodiment of the present invention.

Embodiments of the present invention recognize that software engineers and test engineers delivering production-ready software typically require large amounts of test data that includes various corner edge cases in order to guarantee the delivered software meets the specification requirements. Embodiments recognize that some solutions provide test data that directly uses organic data, which contains unedited, unfiltered data elements that can be used to identify individuals based on private identifying entities within the data. Private identifying entities include data and information of individual persons that can be used in malicious manners and/or lead to identifying an individual, connecting the individual to the private entity information. The use of organic data often requires approval from multiple oversight agencies or may even require approval from individuals represented within the data set. In some cases, the use of organic data exposes groups performing software testing to privacy violations, legal consequences, and may increase risks of data breaches.

Embodiments of the present invention recognize that to overcome concerns and risks of organic data usage some testing organizations or providers embark on manually producing synthetic data attempting to include the same properties as the original organic data set. Such endeavors are extremely time-consuming and therefore do not represent real-time correspondence with the intention of the performance of the software being developed. Data sets must be generated that consider each scenario representing requirements of the software, and standard reusable methodologies to ensure adequate coverage of the test data relative to real data sets (i.e., organic data) aren't typically available.

Embodiments also recognize that semi-automated test data generation can be attempted for portions of the synthetic test data generation process. The semi-automated generation relies on large sets of rules created by test engineers that represent specific corner edge use cases required by the application development specification. The rules are often considered to two types: data rules and constraint rules. The data rules model an original organic dataset based on the properties that are inherent within the dataset. Examples include a knowledge base set of rules that specify the elements or entities within the dataset that can be replaced with synthetic entities. The replacement includes the use of programmatic rules for the conversion of data of one dataset to generate another dataset with synthetic entities.

The constraint rules address the aspects and attributes of the data that are not inherent to the data itself but is relevant to how the data is intended for use. Constraint rules cannot be inferred from the data itself but depend on the context of the use of the data, which requires manually designating constraints and may specify limiting the data to a subset relevant to a particular test scenario. Embodiments of the present invention recognize that a large amount of setup preparation is required to determine data rules and foresee and establish constraint rules for each corner test case, and the setup and preparation of rules are not reusable for changes to the organic dataset on which the semi-automated generation is based.

Embodiments of the present invention provide a method, computer program product, and computer system for the automated generation of synthetic (i.e., artificial) test data from a given source of organic test data in which private entity identifiers within the data are removed and synthetic data entities, matching data type, and statistical properties of the original organic test data, are inserted in placeholder positions of a templated version of the organic test data. Embodiments provide fully automated generation of synthetic data and can provide quantities of synthetic data matching demand levels, by applying subtle synthetic data entity variations to identified private data entities of the organic data set. Embodiments do not require a tedious effort to manually produce rules, however, portions of synthetically generated datasets can be selected for matching corner edge case testing, and the generation of the synthetic dataset is not dependent on particular organic data, which enables ease of use across a plurality of organic datasets.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, organic test data 120, text generation model trainer 130, and domain knowledge base 140, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between server 110, organic test data 120, text generation model trainer 130, and domain knowledge base 140.

Organic test data 120 is a collection of data originating from real-world data that may contain private entities considered to be identifying elements of users whose data is included in the real-world data. Organic test data 120 can include either or both structured and unstructured data. Data entities of organic test data 120 include one or a combination of words, names, numbers, symbols, relationships, correlations, or other elements that identify or can contribute to identifying individuals or attributes of individuals whose data is included in the real-world data source for organic test data 120. Organic test data 120 is provided by data owners in the original form and includes properties and content considered as required for application development testing use cases. Examples of organic unstructured data include: "Mary Smith is 30 years old and has 2 younger sisters and 3 older brothers and has lived in London for 5 years." The data entities of the example unstructured data include: "<Mary><Smith><30><2><3><London><5>." Although embodiments of the present invention apply to either or both structured and unstructured data, description and discussion of embodiment concepts will be directed to unstructured data for convenience and clarity.

Text generation model trainer 130 receives a deidentified test data template and is used as training data for model generation program 200 to create a model that generates a synthetic test data template that corresponds to the original organic test data. In one embodiment of the present invention, text generation model trainer 130 utilizes an encoder-decoder model generation methodology (e.g., sequence-to-sequence model). Text generation model trainer 130 applies a neural network (NN) function combining word vectors with state vectors from the received de-identified test data templates. Each deidentified test data template word or placeholder is added and is encoded for a current state. Learned weights from the NN provides information on how to combine past information (NN memory vector) and current information (new word vector). A probability distribution is formed from the plurality of deidentified test data templates along with supervised training to produce a trained test data generation model.

Domain knowledge base 140 includes a plurality of domain-specific terms and data elements that provides the replacement words and terms used to populate the deidentified test data templates to produce the synthetic test data. Domain knowledge base 140 can be an aggregation of words, terms, numerals, or phrases of a similar type. In some embodiments of the present invention, domain knowledge base 140 is comprised of a dictionary of first and last names and includes listings of countries, states or provinces, cities, and streets. In other embodiments domain knowledge base 140 has a taxonomy structure for locations (i.e., country, state, city, street).

In yet other embodiments, domain knowledge base 140 may include portions of web-based content, such as DBpedia, which includes organized content from the information created in the Wikipedia project. This structured information is made available on the World Wide Web and allows users to semantically query Wikipedia resources, including links to other related datasets. An earlier release of the DBpedia data set describes 6.0 million entities, out of which 5.2 million are classified in a consistent ontology, including 1.5M persons, 810 k places, 135 k music albums, 106 k films, 20 k video games, 275 k organizations, 301 k species, and 5 k diseases. Domain knowledge base 140 may include numeric data, relationship terms, and other data types that are found in organic test data 120. Domain knowledge base 140 provides a source of words, numbers, and other entities used in the generation of synthetic test data.

Server 110 is a computing device hosting model generation program 200 and data insertion program 300 and is configured to operate in a distributed environment. Server 110 is communicatively connected to organic test data 120, text generation model trainer 130, and domain knowledge base 140, via network 150. In some embodiments, server 110 can be blade servers, web servers, laptop computers, desktop computers, standalone mobile computing devices, smartphones, tablet computers, or other electronic devices or computing systems capable of receiving, sending, and processing data. In other embodiments, server 110 may be a computing device interacting with applications and services hosted and operating in a cloud computing environment. In another embodiment, server 110 can be a netbook computer, personal digital assistant (PDA), or another programmable electronic device capable of generating and transmitting input to and receiving programming instructions from event log program 300. Alternatively, in some embodiments, server 110 may be communicatively connected to model generation program 200 and data insertion program 300 operating remotely (not shown). Server 110 may include internal and external hardware components, depicted in more detail in FIG. 4.

Model generation program 200 is a software application depicted as operating on server 110. Model generation program 200 includes data cataloging module 202, deidentification module 204, statistical analysis module 206, and is communicatively connected with text generation model trainer 130 via network 150. Model generation program 200 determines the private data entities of organic test data 120, generates deidentified test data templates, and determines the statistical properties and induced rules within the data. Model generation program 200 interacts with text generation model trainer 130 to create a synthetic test data generation model.

Data cataloging module 202 is a component module of model generation program 200. Data cataloging module 202 receives organic test data 120 and analyzes the content, identifying the private data entities. Data cataloging module 202 catalogs the private data entities identified within organic test data 120. In some embodiments, the private data entities within organic test data 120 to be protected are identified by the use of a data privacy toolkit (DPT).

Deidentification module 204 is a component module of model generation program 200. Deidentification module 204 extracts the private data entities of the organic test data 120, identified by data cataloging module 202, and replaces the extracted private data entity with a template placeholder, corresponding to the type of data extracted. Deidentification module 204 performs the extraction-replacement operation on the entire data set of organic test data 120, which results in a set of test data templates that are used by text generation model trainer 130 to generate and train the synthetic test data model.

For example, data cataloging module 202 identifies first names, last names, and ages of individuals included in organic test data 120. Deidentification module 204 extracts the first names identified by data cataloging module 202 and replaces the extracted first name with a placeholder, such as <first_name>. Similarly, de-identification module 204 extracts last names in organic test data 120 and replaces the last names with placeholder <last_name>, and replaces the numerical age associated with the first and last name of the respective individual with the placeholder <age>. Model generation program 200 sends the collection of de-identified test data templates to text generation model trainer 130 to be used for training the synthetic test data model.

Statistical analysis module 206 is a component module of model generation program 200. Statistical analysis module 206 receives the private data entities cataloged by data cataloging module 202 and deidentification module 204 and performs an analysis to determine the statistical properties of the private data entities of organic test data 120. Statistical analysis module 206 produces a statistical signature that includes a distribution of the types of private data entities (i.e., name, location, age, relatives) and properties that include correlations between private data entity types. Statistical analysis module 206 produces an analytical result that is characteristic of the dataset entities of organic test data 120.

Additionally, statistical analysis module 206 provides induced constraint rules capturing correlations discovered between data entities, such as age limits associated with an individual having a driver's license. Statistical analysis module 206 also provides statistical properties of the private data entities that depict the original distribution of entities, such as the number of individuals included in organic test data 120 that have a first name of Mary, or the relative number of individuals with locations in London, Berlin, New York, and Toronto. Statistical analysis module 206 maintains statistical properties and correlations by mimicking the determined patterns of organic test data 120 and applying the patterns to the synthetic test data by including the property, correlation, and rules information to text generation model trainer 130.

Data insertion program 300 is a software application depicted as operating on server 110. Data generation program 300 generates synthetic test data that includes the statistical properties and induced rules determined from the organic test data. Data insertion program 300 inserts data entities that are artificial with respect to the organic test data in placeholder positions of deidentified test data templates, matching the entity type and characteristics. Data insertion program 300 creates synthetic test data and includes Synthetic data entities generation module 302, synthetic data insertion module 304, and synthetic data filter module 306.

Synthetic data entities generation module 302 is a component module of data insertion program 300 that receives the statistical properties of the private data entities determined by statistical analysis module 206 and applies the properties to domain knowledge base 140. Synthetic data entities generation module 302 generates synthetic data entities similar to, but not exactly the same as, organic test data 120; matching the data type and having the same correlations, characteristics, and statistical properties as the private data entities of organic test data 120.

Synthetic data insertion module 304 is a component module of data insertion program 300. Synthetic data insertion module 302 utilizes the synthetic test data templates and a text generation model to replace the private data entities found in the organic test data by inserting similar type synthetic data entities in the placeholder positions of the synthetic test data templates. Synthetic data insertion module 304 inserts a matching type of synthetic data designated by the placeholder of the synthetic test data template and maintains the statistical properties, correlations, and characteristics of the original test data. As a simplistic example, if the original organic test data set included a certain frequency of the first name "Mary" and a location "Paris", then the synthetic data insertion module 304 maintains a similar frequency between synthetic data entities, such as "Naomi" and "Berlin".

Synthetic data filter module 306 is a component module of data insertion program 300 and provides an optional feature of filtering the generated synthetic test data to include or exclude portions of the synthetic test data based on particular requirements of use cases of the application being developed. Synthetic data filter module 306 applies manually generated rules and constraints to the synthetic data. For example, a particular use case for testing the application may apply to a particular geography, such as North America, or a particular location, such as Geneva, Switzerland. Synthetic data filter module 306 enables test engineers to exercise control over certain corner edge test areas of the application.

Embodiments of the present invention, as mentioned earlier, apply to structured data as well in which the scheme and data structures are determined and maintained in the process of generating the synthetic test data.

Figure 2:
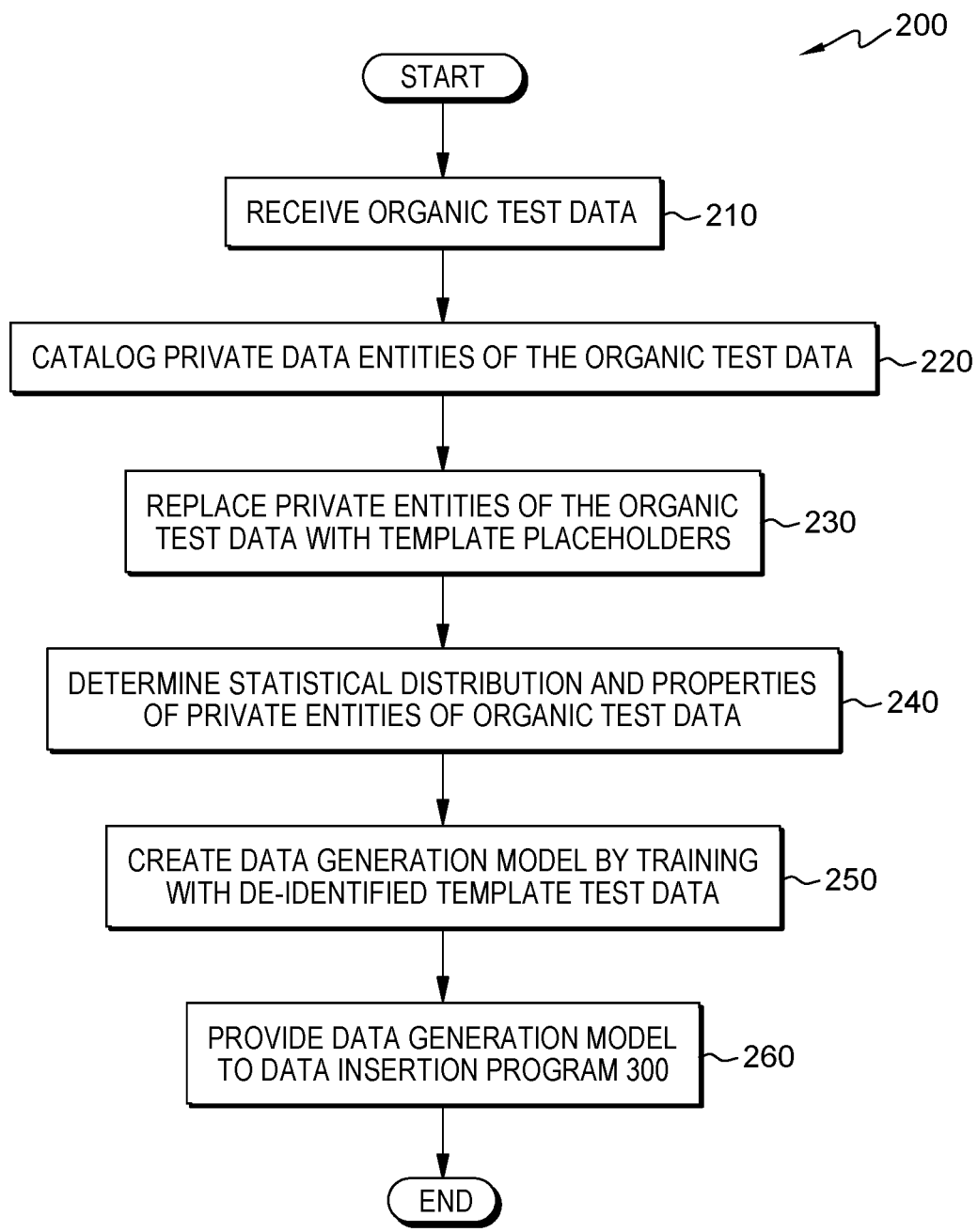
FIG. 2 is a flowchart depicting the operational steps of a model generating program operating in the distributed data processing environment of FIG. 1, in accordance with embodiments of the present invention.

FIG. 2 is a flowchart depicting the operational steps of model generation program 200, operating in distributed data processing environment 100 of FIG. 1, in accordance with embodiments of the present invention. Model generation program 200 provides training data to a data generation model, such as a sequence-to-sequence model generator, and utilizes the model to generate synthetic data entities that align with the statistical properties, characteristics, and patterns of data determined within the original organic test data. Model generation program 200 includes data cataloging module 202, deidentification module 204, and statistical analysis module 206, previously discussed. Herein, the detailed steps performed by the modules are referenced with respect to model generation program 200.

Model generation program 200 receives organic test data (step 210). Model generation program 200 receives a data set for application testing that includes the original entities that are considered private and potentially identify an individual or exposing private or personal data associated with an individual. In some embodiments of the present invention, model generation program 200 stores the organic test data to be used for generating synthetic test data and deletes the received original test data from all memory subsequent to creating the text generation model and synthetic test data. Embodiments of the present invention recognize that consent by appropriate authorities has been given to initially receive the organic test data for purposes of using attributes, content type, and patterns of the original test data to generate synthetic test data.

Model generation program 200 performs cataloging of private data entities of the organic test data (step 220). Model generation program 200 analyzes the received organic test data content and identifies the private data entities included in the organic test data. In some embodiments of the present invention, private data entities are identified by using patterns of regular expressions, dictionaries, or code that characterizes private and sensitive data, such as detection of "@" and a domain in emails, dictionaries of English names, valid Zip Codes for an area, or medical terms and condition/treatment codes. The identified private data entities include content considered to enable identification of the individual to which the data applies, or includes, personal or private information of the individual. Model generation program 200 catalogs the private data entities identified within organic test data 120, determining a type of data, such as a first name, a last name, an age, a country location, and a city location, as examples. In some embodiments, the private data entities within organic test data 120 to be protected are identified by the use of a toolkit to detect and manage data privacy.

For example, model generation program 200 analyzes organic test data 120 and identifies private data entities associated with individuals included in organic test data 120. Model generation program 200 identifies the entities and determines the type of data, such as first names, last names, relationship data, location data, and age data.

Model generation program 200 replaces private data entities of the organic test data with template placeholders (step 230). Having determined the private data entities within the organic test data and the type of private entity, model generation program 200 extracts the private data entities from the original organic test data and inserts a placeholder for the extracted private data entity. The original organic test data becomes a plurality of synthetic test data templates that maintain their original structure, but include the placeholders instead of the private data entities. The placeholder includes information that indicates the type of data entity that has been extracted.

For example, model generation program 200 accesses the cataloged private data entities identified from organic test data 120. Model generation program 200 locates each instance of a private data entity within the unstructured organic test data, such as a first name and a last name, and extracts the instances of the first name (i.e., Mary) and the last name (i.e., Smith). Model generation program 200 replaces the position held by the first name with the placeholder "first_name0001", including information regarding the type of data entity extracted from a position within the organic data. The information indicates the type of entity data and may accommodate multiple instances of the type of entity data, such as 100 occurrences of the first name "Mary."

Model generation program 200 determines the statistical distribution and properties of the private data entities of the organic test data (step 240). Model generation program 200 performs an analysis of the cataloged private data entities of the original organic test data that produces the statistical properties of the private data entities, which may include the frequency of an entity and correlations between entities. Additionally, model generation program 200 determines the characteristics of the private data entities and patterns within the data. For example, model generation program 200 determines that there are 827 instances of the first name "Mary" within the organic test data, of which 233 reside in London, but there are no instances of the first name "Mary" that reside in Paris. Model generation program 200 may determine that 421 instances of the first name of "Mary" are under the age of 35, but only 374 have driver's licenses.

Model generation program 200 creates a data generation model by training with deidentified test data templates (step 250). In one embodiment, for unstructured data, model generation program 200 utilizes a sequence-to-sequence neural network model and a text generation trainer application and applies the de-identified test data templates to the trainer application to generate a synthetic data generation model. In some embodiments of the present invention, the text generation trainer trains a model enabling model generation program 200 to generate synthetic test data templates that correspond to the original organic test data, without the private data entities.

In one embodiment of the present invention, model generation program 200 utilizes an encoder-decoder model generation methodology (e.g., sequence-to-sequence model). Model generation program 200 applies a neural network (NN) model, for example, combining word embedding vectors with state vectors from the received de-identified test data templates. Each deidentified test data template word or placeholder is added and is encoded for a current state. Learned weights from the NN provide information on how to combine past information (NN memory vector) and current information (new word vector). A probability distribution is formed from the plurality of deidentified test data templates along with supervised training to produce a trained test data generation model. Text generation trainer 130 receives de-identified test data templates, applies weights to unstructured word components and placeholders of the template so that the model can replace the placeholders by adding words to the template that make sense with the remainder of the template. Model generation program 200 produces a synthetic test data model that can produce multiple versions of the template sentence/phrase by repeatedly applying different terms to placeholders, remembering the previous words/terms applied to the placeholder, and subsequently applying new terms.

Model generation program 200 provides the data generation model to data insertion program 300 (step 260). Having generated a data generation model (for some unstructured data, a text generation model), model generation program 200 provides the data generation model access to data insertion program 300 and ends. In some embodiments of the present invention, the data generation model is changed by submitting a new or additional organic test data set, and processing through model generation program 200.

Figure 3:
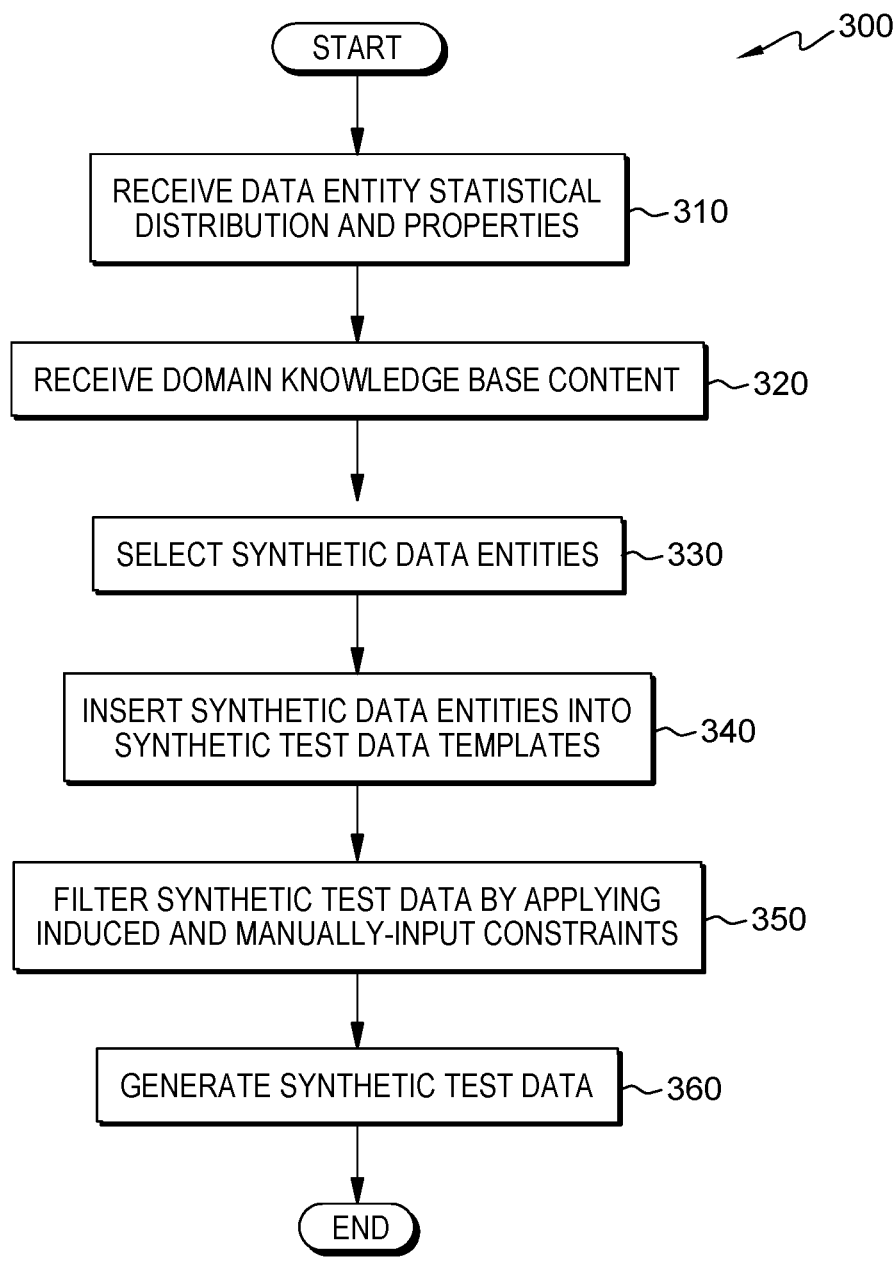
FIG. 3 is a flowchart depicting the operational steps of a data insertion program operating in the distributed data processing environment of FIG. 1, in accordance with embodiments of the present invention.

FIG. 3 is a flowchart depicting the operational steps of data insertion program 300, operating in the distributed data processing environment of FIG. 1, in accordance with embodiments of the present invention. Data insertion program 300 accesses the data generation model created by model generation program 200 and generates synthetic test data by insertion of synthetic data entities of placeholders of the synthetic test data templates.

Data insertion program 300 receives the data entity's statistical distribution and properties (step 310). Data insertion program 300 receives the statistical properties, correlations, patterns, and characteristics determined during the analysis of the original organic test data by model generation program 200. Data insertion program 300 utilizes the statistical properties of the organic test data to determine the frequency, correlations, and patterns to apply to the synthetic data entities to maintain the characteristics of the original organic test data.

For example, data insertion program 300 receives the statistical properties and correlations, and patterns of organic test data 120 from the analysis performed by statistical analysis module 206 of model generation program 200. The statistical properties may indicate a frequency of private data entities, such as a first name, and includes correlations with other private data entities such as location and age. Data insertion program 300 retains the statistical properties, correlations, and patterns to apply in the generation of synthetic test data to maintain similarity with organic test data 120.

Data insertion program 300 receives domain knowledge base content (step 320). Data insertion program 300 accesses and receives domain knowledge base content that includes large quantities of data entities for a particular domain of data, such as personal information of individuals. In some embodiments, data insertion program 300 accesses and receives content from a plurality of domain knowledge bases that correspond to the data entity types of the organic test data. Data insertion program 300 determines the data entity content of the domain knowledge base matching data types of the private data entities included in the statistical properties of the organic test data. In some embodiments, domain knowledge bases for unstructured organic test data may include dictionaries of words, names, locations, or may include taxonomies of locations (i.e., country, state/province, city, street), or other data sets.

Data insertion program 300 selects synthetic data entities (step 330). Data insertion program 300 applies the statistical properties, correlations, and patterns determined from the original organic test data to the contents of the domain knowledge base(s) and selects data entities matching the data type and similar to the private data entities of the organic test data. For example, data insertion program 300 accesses domain knowledge base 140 and determines the knowledge base includes a listing of first names, last names, age, location cities, and relationship types. In the example, the original organic test data includes listings of first and last names and location cities. Data insertion program 300 selects from the content of domain knowledge base 140 a listing of first names, last names, and location cities, excluding the data entities of age and relationship types.

Data insertion program 300 generates synthetic test data by inserting synthetic data entities into respective synthetic test data templates (step 340). Data insertion program 300 receives respective synthetic test data templates that include placeholders, and each placeholder indicates the particular data type that is replaced. Data insertion program 300 inserts a synthetic data entity acquired from a domain knowledge base in the place of a placeholder of the synthetic test data template for each respective synthetic test data template. The synthetic test data template maintains the original format of the unstructured data. Data insertion program 300 inserts a synthetic data entity selected from the domain knowledge base and corresponding to the same data type of the original organic test data in the placeholder positions.

For example, data insertion program 300 receives the synthetic test data templates that are produced from organic test data 120 and including placeholders for extracted private data entities. Data insertion program 300 inserts a synthetic data entity, such as a first name of "Naomi", which has been selected from domain knowledge base 140, and which corresponds to the data type of "first name" indicated from information associated with the placeholder. Data insertion program 300 maintains statistical properties and correlations associated with organic test data 120 as synthetic data entities are inserted in synthetic test data templates.

Data insertion program 300 filters synthetic test data by applying data-induced and manually-input constraints (step 350). The analysis of the organic test data and extracted private data entities performed by model generation program 200 includes determining rules that are induced within the data itself in addition to statistical properties and correlations. Data insertion program 300 applies the induced rules as the selection and insertion of synthetic data entities are performed, resulting in the filtering of the synthetic test data entities inserted into placeholder positions of the synthetic test data templates.

For example, induced rules may determine that the original organic test data does not include any data associated with the first name of "Mary" combined with a city location of "Paris". Similarly, test data including information regarding individuals with driver's license would have a minimum age level, because a driver's license cannot be acquired until an individual reaches legal driving age. Therefore, the synthetic test data would reflect a similar association of individuals that have a driver's license and having an age at or greater than the minimum legal driving age.

Additionally, data insertion program 300 can receive an optional set of constraint rules to be applied to the generation of the synthetic test data, providing additional filtering. For example, for a particular corner edge use case of application testing, the synthetic test data may be required to be reduced to a particular age range, or a subset of locations. The constraint rules are input to data insertion program 300 manually, which applies the additional constraints in generating and filtering the resulting synthetic test data that includes synthetic data entities. Data insertion program 300 removes the synthetic test data that does not conform to the filter rules. As another example, electronic purchasing transaction data from the use of a credit card for an online purchase typically includes positive quantities, however, in cases of a refund or adjustment, the transaction may include negative quantities. Application test engineers may manually indicate the constraint to include negative transaction quantities in the synthetic test data.

Data insertion program 300 generates synthetic test data (step 360). Data insertion program 300 completes synthetic data entity insertion for the respective synthetic test data templates and applies the data-induced rules and manually added constraint rules, which produces the synthetic test data. In embodiments of the present invention, the quantity of synthetic test data is not limited by the quantity of original organic test data. By varying selection of synthetic data entities and including additional data entities from domain knowledge bases as sources, data insertion program 300 can produce a near-unlimited amount of test data while maintaining the properties and correlations determined within the original organic data set. Having generated synthetic test data, data generation program 300 ends.

Figure 4:
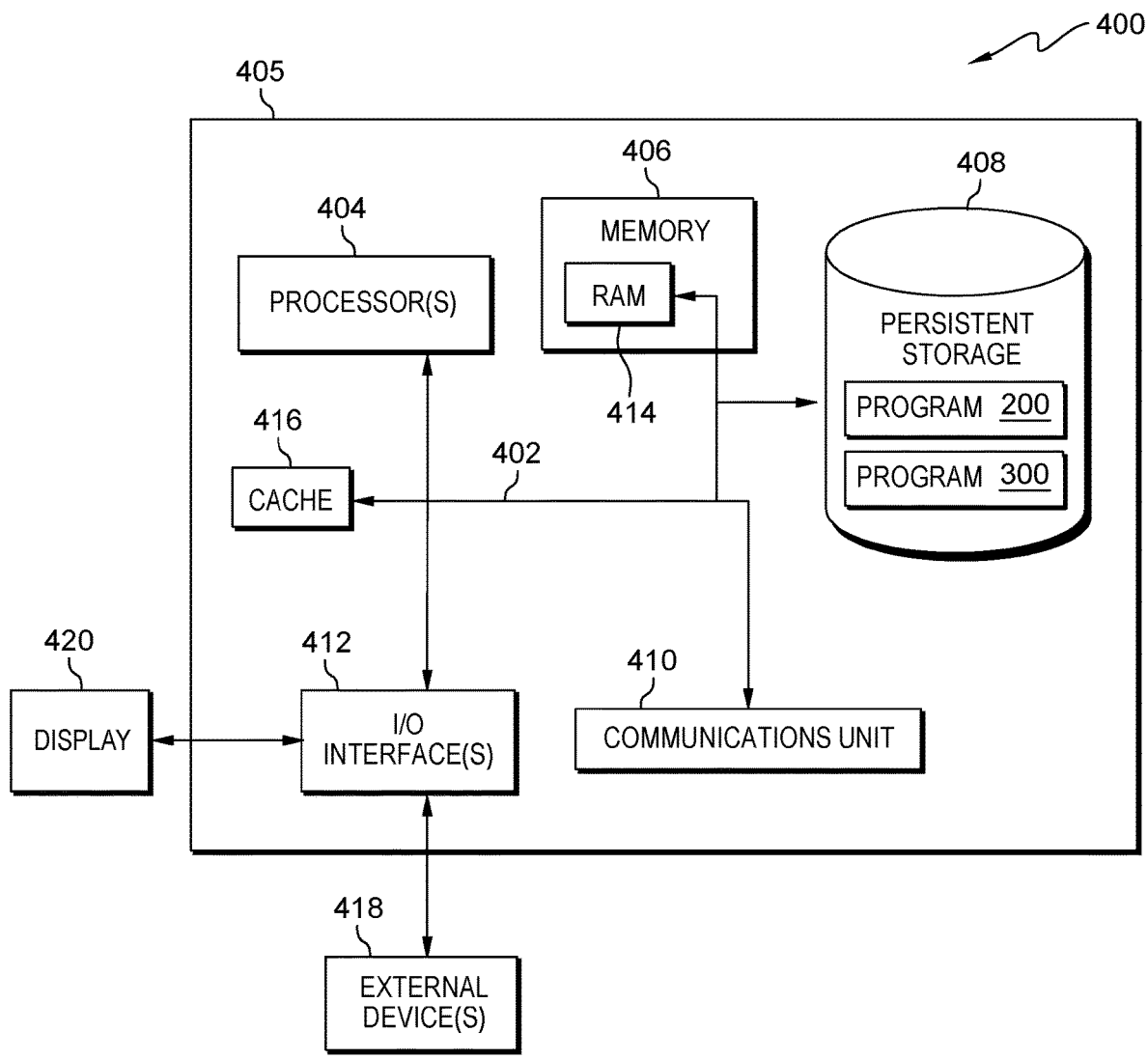
FIG. 4 depicts a block diagram of components of a computing system, including a computing device configured to operationally perform the model generating program of FIG. 2 and the data insertion program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform model generation program 200 and data insertion program 300 of FIGS. 2 and 3, respectively, in accordance with an embodiment of the present invention.

Computing device 405 includes components and functional capability similar to components of server 110, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, model generation program 200 and data insertion program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Model generation program 200 and data insertion program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., model generation program 200 and data insertion program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a set of synthetic test data, the method comprising:
   receiving, by one or more processors, an organic dataset and a domain knowledge base;
   identifying, by the one or more processors, private data entities present within the organic dataset;
   determining, by the one or more processors, statistical properties of the private data entities identified within the organic dataset, including a determination of correlations among the private data entities and patterns of the private data entities within the organic dataset;
   creating, by the one or more processors, a test data model including a plurality of test data templates by removing the private data entities from the organic dataset, and inserting a placeholder term corresponding to the respective removed private data entities, wherein the placeholder term includes an indicator of the data type of the private data entities that are removed;
   selecting from the domain knowledge base, by the one or more processors, synthetic data entities that match a data type of the removed private data entities, respectively, and that maintain the statistical properties determined from the removed private data entities, wherein the statistical properties include a distribution of data types, characteristics of the data types, and correlations among the removed private data entities; and
   generating, by the one or more processors, synthetic test data by inserting, respectively, the synthetic data entities of the matching data type and having consistency with the statistical properties determined for the removed private data entities, into the placeholder term positions of the test data templates.

2. The method of claim 1, further comprising:
   generating, by the one or more processors, a test data generating model using a sequence-to-sequence model; and
   training, by the one or more processors, the test data generating model, based on the plurality of test data templates and the statistical properties of the identified private data entities of the organic dataset.

3. The method of claim 1, further comprising:
   determining, by the one or more processors, rules applicable to the synthetic test data that are induced by statistical analysis of the organic dataset;
   filtering, by the one or more processors, the synthetic test data based on the rules that are induced by the statistical analysis of the organic dataset; and removing from the synthetic test data, by the one or more processors, synthetic test data that does not conform with the rules that are induced by the statistical analysis of the organic dataset.

4. The method of claim 1, wherein the synthetic test data is filtered by constraint rules that are input manually and correspond to a corner use case test.

5. The method of claim 1, wherein a quantity of the synthetic test data is generated to meet a required quantity based on varying the synthetic data entities selected from the domain knowledge base.

6. A computer program product for generating a set of synthetic test data, the computer program product comprising:
  a computer readable storage medium, and program instructions stored on the computer readable storage medium, the program instructions comprising:
    program instructions to receive an organic dataset and a domain knowledge base;
    program instructions to identify private data entities present within the organic dataset;
    program instructions to determine statistical properties of the private data entities identified within the organic dataset, including a determination of correlations among the private data entities and patterns of the private data entities within the organic dataset;
    program instructions to create a test data model including a plurality of test data templates by removing the private data entities from the organic dataset, and inserting a placeholder term corresponding to the respective removed private data entities, wherein the placeholder term includes an indicator of the data type of the private data entities that are removed;
    program instructions to select from the domain knowledge base, by the one or more processors, synthetic data entities that match a data type of the removed private data entities, respectively, and that maintain the statistical properties determined from the removed private data entities, wherein the statistical properties include a distribution of data types, characteristics of the data types, and correlations among the removed private data entities; and
    program instructions to generate synthetic test data by inserting, respectively, the synthetic data entities of the matching data type and having consistency with the statistical properties determined for the removed private data entities, into the placeholder term positions of the test data templates.

7. The computer program product of claim 6, further comprising program instructions, stored on the computer readable storage medium, to:
  generate a test data generating model using a sequence-to-sequence model; and
  train the test data generating model, based on the plurality of test data templates and the statistical properties of the identified private data entities of the organic dataset.

8. The computer program product of claim 6, further comprising program instructions, stored on the computer readable storage medium, to:
  determine rules applicable to the synthetic test data that are induced by statistical analysis of the organic dataset;
  filter the synthetic test data based on the rules that are induced by the statistical analysis of the organic dataset; and
  remove from the synthetic test data, synthetic test data that does not conform with the rules that are induced by the statistical analysis of the organic dataset.

9. The computer program product of claim 6, wherein the synthetic test data is filtered by constraint rules that are input manually and correspond to a corner use case test.

10. The computer program product of claim 6, wherein a quantity of the synthetic test data is generated to meet a required quantity based on varying the synthetic data entities selected from the domain knowledge base.

11. A computer system for generating a set of synthetic test data, the computer system comprising:
  one or more computer processors;
  a computer readable storage medium, and program instructions stored on the computer readable storage medium, the program instructions comprising:
    program instructions to receive an organic dataset and a domain knowledge base;
    program instructions to identify private data entities present within the organic dataset;
    program instructions to determine statistical properties of the private data entities identified within the organic dataset, including a determination of correlations among the private data entities and patterns of the private data entities within the organic dataset;
    program instructions to receive an organic dataset and a domain knowledge base;
    program instructions to identify private data entities present within the organic dataset;
    program instructions to determine statistical properties of the private data entities identified within the organic dataset;
    program instructions to create a test data model including a plurality of test data templates by removing the private data entities from the organic dataset, and inserting a placeholder term corresponding to the respective removed private data entities, wherein the placeholder term includes an indicator of the data type of the private data entities that are removed;
    program instructions to select from the domain knowledge base, by the one or more processors, synthetic data entities that match a data type of the removed private data entities, respectively, and that maintain the statistical properties determined from the removed private data entities, wherein the statistical properties include a distribution of data types, characteristics of the data types, and correlations among the removed private data entities; and
    program instructions to generate synthetic test data by inserting, respectively, the synthetic data entities of the matching data type and having consistency with the statistical properties determined for the removed private data entities, into the placeholder term positions of the test data templates.

12. The computer system of claim 11, further comprising program instructions, stored on the computer readable storage medium for execution by at least one of the one or more processors, to:
  generate a test data generating model using a sequence-to-sequence model; and
  train the test data generating model, based on the plurality of test data templates and the statistical properties of the identified private data entities of the organic dataset.

13. The computer system of claim 11, further comprising program instructions, stored on the computer readable storage medium for execution by at least one of the one or more processors, to:

determine rules applicable to the synthetic test data that are induced by statistical analysis of the organic dataset;

filter the synthetic test data based on the rules that are induced by the statistical analysis of the organic dataset; and remove from the synthetic test data, synthetic test data that does not conform with the rules that are induced by the statistical analysis of the organic dataset.

14. The computer system of claim 11, wherein a quantity of the synthetic test data is generated to meet a required quantity based on varying the synthetic data entities selected from the domain knowledge base.

* * * * *